Oct. 15, 1929.                    T. REYMAN                    1,731,685
                        ELECTRIC METER PROTECTIVE MEANS
                              Filed July 9, 1926
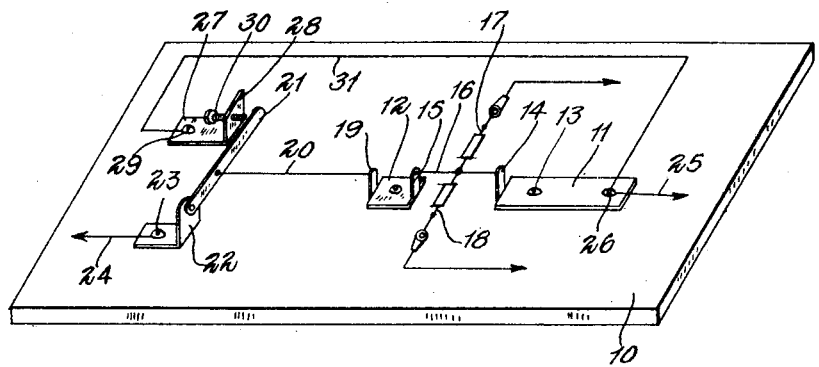
Inventor
Theodore Reyman
By his Attorney
George E. Heinrich Patented Oct. 15, 1929

1,731,685

UNITED STATES PATENT OFFICE

THEODORE REYMAN, OF NEW YORK, N. Y.

ELECTRIC-METER PROTECTIVE MEANS

Application filed July 9, 1926. Serial No. 121,380.

My invention relates to a device for protecting the thermo couples of electric measuring instruments against excessive currents. and it is the principal object of my invention to provide a device in which a wire becoming heated under an overload of current expands and closes a shunt circuit, opening the same again and allowing the current to flow normally upon restoration of normal conditions in the circuit.

Another object of my invention is the provision of a simple and inexpensive protective device of this type, which is durable and easily installed, yet positive and efficient in its operation.

These and other objects and advantages of my invention will become more fully known as the description thereof proceeds, and will then be specifically defined in the appended claims.

The single figure 2 in the accompanying drawing illustrates in perspective view a device constructed according to my invention.

My improved device, as illustrated on the drawing, is adapted to be secured to any meter for electric current of approved type at any suitable place thereof, and as shown, consists of a base plate 10 or the like, insulated from the meter, on which are mounted the metal contact plates 11 and 12 of uneven length, secured to the base plate by means of screw 13 or the like.

The longer plate 11 has an upright lip 14 made integrally therewith, and the shorter plate 12 has a similar upright lip 15, and both lips 14 and 15 are connected by means of a wire 16 from which branch off the fine wires 17 and 18 leading to the instrument to be protected.

The plate 12 has another upright lip 19 oppositely disposed to the lip 15, and a wire 20 expanding under the heat developed by an excess of electric current is attached at one end to the lip 19, while its opposite end is secured to a flat metal spring or leaf spring 21 intermediate the ends thereof. One end of this spring is secured to a plate or post 22 held to the base 10 by means of a screw 23 or the like to which is also attached one terminal wire 24 of the high frequency current for the instrument with which such meters are used, an X-ray apparatus or the like. The other terminal wire 25 of the high frequency circuit is attached to a screw 26 on plate 11.

A plate or post 27 equipped with an upright tongue 28 is secured by means of a screw 29 or the like to the base 10, and a contact screw 30 or the like, extends through the tongue in approximately its center part into the neighborhood of the free end of the metal leaf spring 21, while a shunt wire designated 31 is attached at one end to the screw 29 and at its opposite end to the screw 26 of plate 11.

The device operates as follows:

The wire 20 expands during the passage of an excess in the electric current due to heating thereby, and permits the spring 21 to make contact with screw 30 so that the current is shunted over wire 31 until the wire 20 cools off and contracts again removing the spring or disengaging the same from its contact with screw 30 again, thus protecting the thermo couples of electric measuring instruments against damage by excessive current.

It will be clear that such changes as come within the scope of the appended claims may be made without departure from the spirit and gist of my invention.

Having thus described my invention, what I claim as new and desire to protect by Letters Patent is:

A device for protecting the thermo couples of electric measuring instruments against excessive currents, comprising a base, a pair of contact plates of uneven length on said base, an upright lip on the longer of said plates and two upright lips on the shorter of said contact plates, a wire connecting the lip on said longer plate with one of the upright lips on the shorter of said plates, a post on said base, a leaf spring secured at one end to said post, an expansion wire connecting the other of the upright lips on said shorter contact plate with said leaf spring intermediate the ends thereof, a post on said base near the free end of said leaf spring, a perforated upright tongue on said last named post, a screw passed through the perforation of said tongue normally spaced from the free end of said spring, and normally held in spaced relation thereto by said expansion wire, a shunt wire connecting the post with the upright tongue to the longer of said contact plates for shunting the current over said shunt wire upon the expansion of the expansion wire under an overload of current engaging said leaf-spring with said screw, and allowing the expansion wire to cool off for again disengaging said leaf spring from said screw allowing the current to flow normally.

Signed at New York in the county of New York and State of New York this 8th day of July, A. D. 1926.

THEODORE REYMAN.